July 28, 1953 P. CATANESE 2,646,621
THORN-REMOVING DEVICE AND STEM CUTTER
Filed Feb. 20, 1952
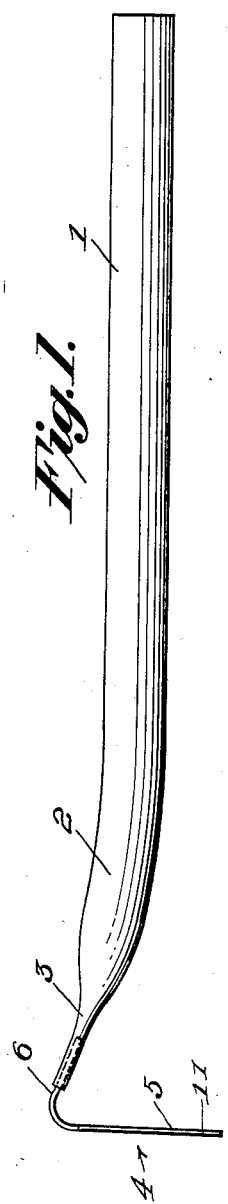
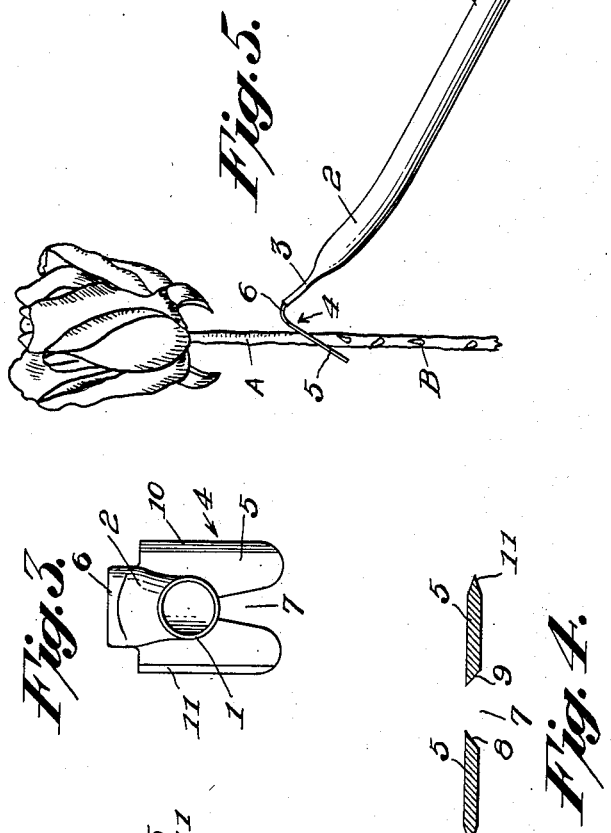
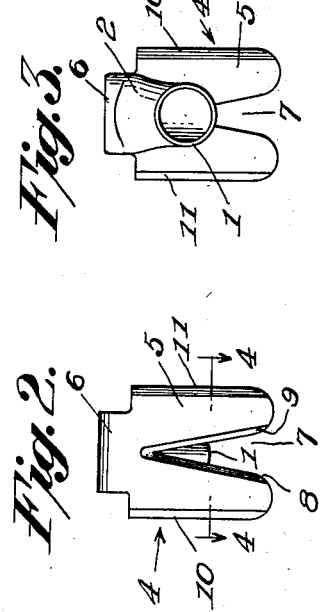
Inventor:
Paul Catanese.
Attorney Patented July 28, 1953

2,646,621

UNITED STATES PATENT OFFICE 2,646,621

THORN-REMOVING DEVICE AND STEM CUTTER

Paul Catanese, Norristown, Pa.

Application February 20, 1952, Serial No. 272,579

2 Claims. (Cl. 30—317)

The present invention relates to improvements in horticultural tools and has reference more particularly to a device for removing the thorns and/or foliage from the stems of flowers, such as roses and the like.

The principal object of the invention is to provide a device that will accommodate stems of different diameters and which will, at a single stroke, remove the thorns and/or foliage without damaging either the flower or the stem.

A further and important object of the invention resides in the provision of sharpened cutting edges at the sides of the head of the device which will enable either a right or left handed operator to cut off the stem at the desired length.

A still further object is to provide a device of the above mentioned character that will be inexpensive, strong and durable and at all times positive and efficient in its operation.

Other objects and advantages will become apparent from the following description when taken in connection with the accompanying drawing.

In the drawing, wherein there is shown the preferred embodiment of my invention and wherein like numerals designate corresponding parts throughout the several views:

Figure 1 is a side elevation of my device.

Figure 2 is a front end elevation.

Figure 3 is a rear end elevation.

Figure 4 is a transverse section taken approximately on the line 4—4 of Figure 2, looking in the direction of the arrows, and Figure 5 is an elevational view showing the device in the act of removing thorns from the stem of a rose.

Referring to the drawing, the numeral 1 designates an elongated tubular handle formed from stainless steel. The forward end portion is bent slightly upwardly as indicated at 2 and terminates in a flattened socket 3.

Forming a salient part of my device is the head, denoted generally by the numeral 4, also formed of stainless steel. This head includes a flat plate-like body 5, from the upper edge of which extends a rearwardly directed flat shank 6. The free end portion of the shank 6 is adapted to be received in the flattened socket 3 and fixedly secured therein in any suitable manner. Thus, the head 4 will be disposed substantially at right angles to the handle 1.

An inverted V-shaped notch 7 extends upwardly from the lower edge of the body 5 at the center thereof and terminates adjacent the upper edge of the body, as clearly illustrated in Fig. 2 of the drawing.

The edges of the V-shaped notch are beveled on one face only to form coacting sharpened thorn and/or foliage cutting and removing edges 8 and 9.

The outer side edges of the body 5 are beveled on both faces to provide cutting edges 10 and 11, the purpose of which will be presently described.

In use, the stem of the flower is held in one hand and the device is grasped by the handle 1 in the other hand and the notched head 4 embraces the stem A of a flower, in the manner as shown in Figure 5. By moving the handle and head downwardly, the coacting edges 8 and 9 of the inverted V-shaped notch will engage and remove the thorns B on the stem, as well as any foliage that also may be on the stem in a single downward stroke of the tool, and this without causing any damage to the stem or flower.

The stem of the flower may be cut off at any desired length by using either cutting edge 10 or 11, depending upon whether the operator is left-handed or right-handed.

The provision of the inverted V-shaped notch enables the device to be used on stems of varying diameters with equal facility.

While I have shown the preferred embodiment of my invention, it is to be understood that various changes in the size, shape and arrangement of parts, without departing from the spirit of the invention and the scope of the appended claims, may be made.

While the device is preferably formed of stainless steel, the same may be formed of any other suitable material and I do not wish to limit myself to the particular material used.

Having thus described my invention, what I claim is:

1. A device for removing thorns and the like from a stem comprising an elongated tubular handle, the forward end portion thereof being curved slightly upwardly and terminating in a flattened socket, a head comprising a flat plate-like body, a reduced flat shank formed on the upper end of the body and extending rearwardly therefrom, the free end portion of the shank being secured in the flattened socket, whereby the head will be disposed at substantially right angles to the handle, said body being formed with an inverted V-shaped notch that extends upwardly from the lower edge of the body, said notch adapted to embrace the stem, the edges of the notch being sharpened for cutting and removing the thorns when the handle is grasped and the head is moved downwardly along the stem.

2. A device for removing thorns and the like from a stem comprising an elongated tubular handle, the forward end portion thereof being curved slightly upwardly and terminating in a flattened socket, a head comprising a flat plate-like body, a reduced flat shank formed on the upper end of the body and extending rearwardly therefrom, the free end portion of the shank being secured in the flattened socket, whereby the head will be disposed at substantially right angles to the handle, said body being formed with an inverted V-shaped notch that extends upwardly from the lower edge of the body, said notch adapted to embrace the stem, the edges of the notch being sharpened for cutting and removing the thorns when the handle is grasped and the head is moved downwardly along the stem, and a stem cutting knife edge formed along one of the outer side edges of the body.

PAUL CATANESE.

References Cited in the file of this patent

UNITED STATES PATENTS

| Number | Name | Date |
|---|---|---|
| 137,755 | Barnes | Apr. 15, 1873 |
| 457,385 | Terrell | Aug. 11, 1891 |
| 483,588 | Sunderlin | Oct. 4, 1892 |
| 1,086,993 | Camanada | Feb. 10, 1914 |
| 1,879,909 | Roberts | Sept. 27, 1932 |
| 2,010,590 | Grumbacher | Aug. 6, 1935 |